United States Patent [19]

Skurka

[11] Patent Number: 4,621,714

[45] Date of Patent: Nov. 11, 1986

[54] VEHICLE SLACK ADJUSTER CLUTCH

[75] Inventor: James A. Skurka, Niles, Ill.

[73] Assignee: Sloan Valve Company, Franklin Park, Ill.

[21] Appl. No.: 754,462

[22] Filed: Jul. 12, 1985

[51] Int. Cl.⁴ ............................................. F16D 65/60
[52] U.S. Cl. .............................. 188/196 BA; 74/142; 188/79.5 K; 192/46; 192/108
[58] Field of Search .................. 188/196 BA, 79.5 K, 188/82.74, 82.9, 85, 196 R; 192/46, 108, 111 A, 12 B; 74/142

[56] References Cited

U.S. PATENT DOCUMENTS

| | | | |
|---|---|---|---|
| 823,369 | 6/1906 | Schroeder | 192/108 X |
| 1,696,179 | 12/1928 | Ahlm | 192/108 X |
| 2,062,930 | 12/1936 | Pritchard | 192/46 X |
| 2,402,037 | 6/1946 | Geopfert | 74/142 |
| 3,743,065 | 7/1973 | Rencin et al. | 192/46 X |
| 4,544,046 | 10/1985 | Lissau | 188/79.5 K |

FOREIGN PATENT DOCUMENTS 0526451  6/1956  Canada .............................. 192/108

Primary Examiner—Bruce H. Stoner, Jr.
Assistant Examiner—Michael P. Gilday
Attorney, Agent, or Firm—Kinzer, Plyer, Dorn & McEachran

[57] ABSTRACT

A slack adjuster for vehicle brakes is adapted to be mounted between the brake chamber and the brake operating shaft. The slack adjuster includes a body and a drive member movable relative to and positioned by the body on the brake operating shaft. A lever arm is pivoted to the body and there is an adjustable connection between the lever arm and drive member for the sensing and take up of slack during a brake application. The adjustable connection includes a clutch having facing and relatively rotatable clutch surfaces, each of which has opposing cooperating ratchet teeth. The teeth on one of said surfaces are separated into a plurality of radially spaced circumferential bands. The teeth in each band are positioned to independently engage the teeth on the opposing clutch face to provide increments of slack adjustment.

13 Claims, 18 Drawing Figures

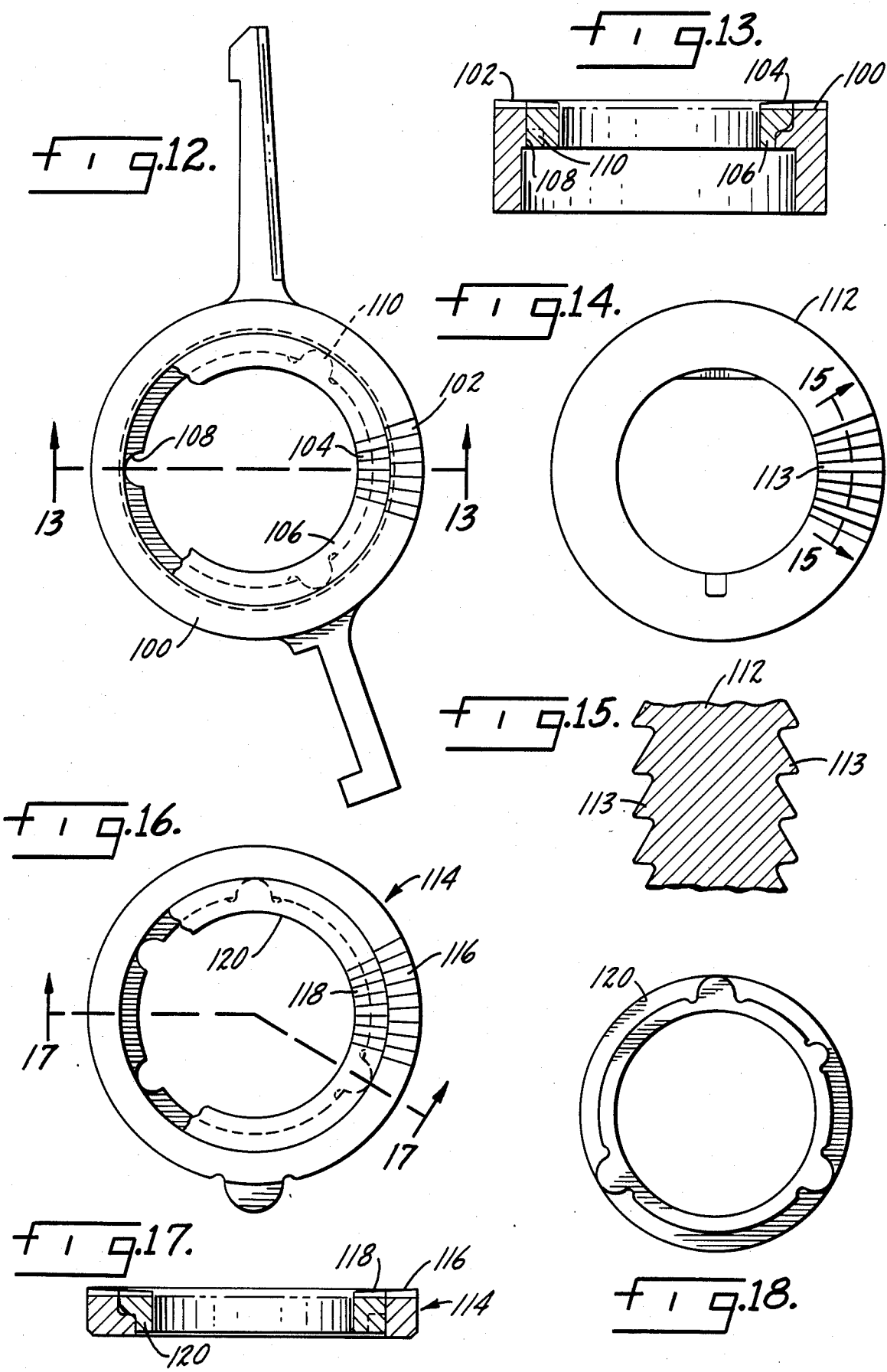

4,621,714

VEHICLE SLACK ADJUSTER CLUTCH

SUMMARY OF THE INVENTION

The present invention relates to slack adjusters for use in over-the-road vehicles such as trucks or the like and has particular relation to such a slack adjuster which utilizes a ratchet clutch in the slack adjustment mechanism.

A primary purpose of the invention is a slack adjuster of the type described having a clutch with relatively rotatable clutch surfaces with opposing ratchet teeth, with the teeth on one clutch surface being separated into radially spaced bands to provide increments of slack adjustment which are a multiple of the number of teeth on the opposing clutch surface.

Another purpose is a clutch mechanism in which a pair of opposing clutch surfaces each have cooperating ratchet teeth, with the teeth on one of the surfaces being separated into a plurality of radially spaced circumferential bands to provide increments of adjustment which are a multiple of the number of teeth on the opposite clutch face.

Another purpose is a slack adjuster of the type described using an adjustment clutch having opposing clutch surfaces with radially spaced bands of adjustment teeth on one clutch surface.

Another purpose is a slack adjuster of the type described utilizing clutch elements in which the adjustment teeth are separated into bands to provide a higher multiple of incremental steps of slack adjustment.

Other purposes will appear in the ensuing specification, drawings and claims.

BRIEF DESCRIPTION OF THE DRAWINGS

The invention is illustrated diagrammatically in the following drawings wherein:

FIG. 12 is a side view, similar to FIG. 3, but illustrating a modified form of adjustment member, FIG. 13 is a section along plane 13—13 of FIG. 12, FIG. 14 is a side view, similar to FIG. 6, but illustrating a modified form of clutch member, FIG. 15 is a section along plane 15—15 of FIG. 14, FIG. 16 is a side view, similar to FIG. 8, but illustrating a modified form of adjuster clutch, FIG. 17 is a section along plane 17—17 of FIG. 16, and FIG. 18 is a side view of the insert used in the adjuster clutch of FIGS. 16 and 17.

DESCRIPTION OF THE PREFERRED EMBODIMENT

One of the principal problems in automatic slack adjusters of the type used today on over-the-road vehicles such as trucks or the like is that the slack adjuster may not differentiate between wear on the brake drum and brake drum expansion from overheating. A take-up of slack which appears to be caused by wear, but which is in fact caused by expansion of the brake drum due to heat, can cause subsequent improper operation of the brakes. The present invention is concerned with the problem of differentiation between actual slack caused by brake drum wear and brake drum expansion due to overheating and limits the amount of slack which may be taken up on any one brake application. Thus, brake drum wear, which will be gradual in nature, can be accomodated by the amount of slack permitted to be taken up in a single brake application. Whereas, expansion of a brake drum caused by overheating, which would be a more abrupt change of the brake drum diameter than that caused by brake drum wear, will not bring about an adjustment of the slack adjuster an amount more than the increment permitted by the clutch structure disclosed herein. The amount of slack which can be taken up on any one brake application is limited by the cam disclosed herein and by the adjustment clutch, regardless of the amount of slack sensed during a brake application.

Figure 1:
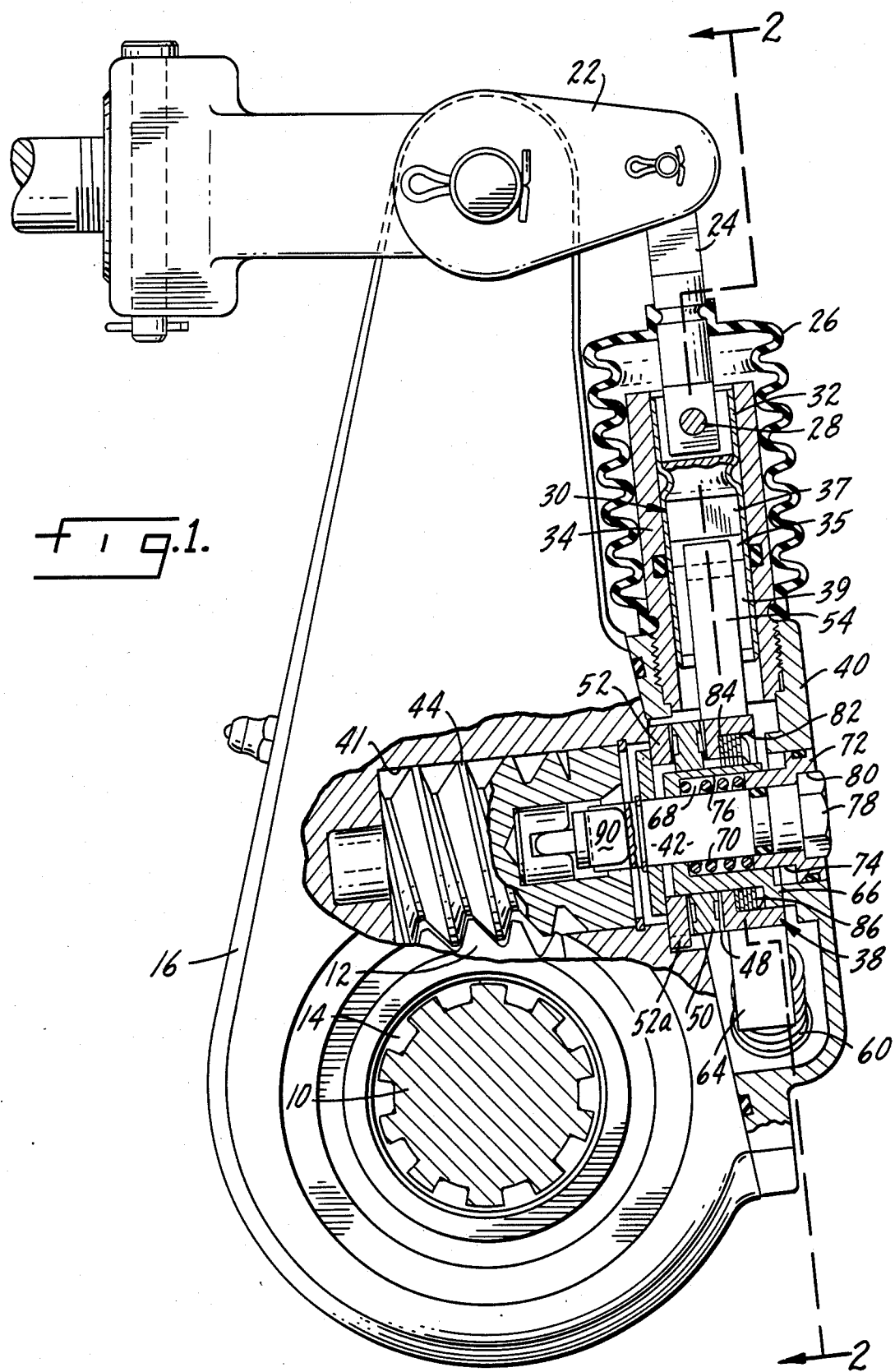
FIG. 1 is a side elevation of a slack adjuster of the type described, showing portions of the slack adjuster in section.
Figure 2:
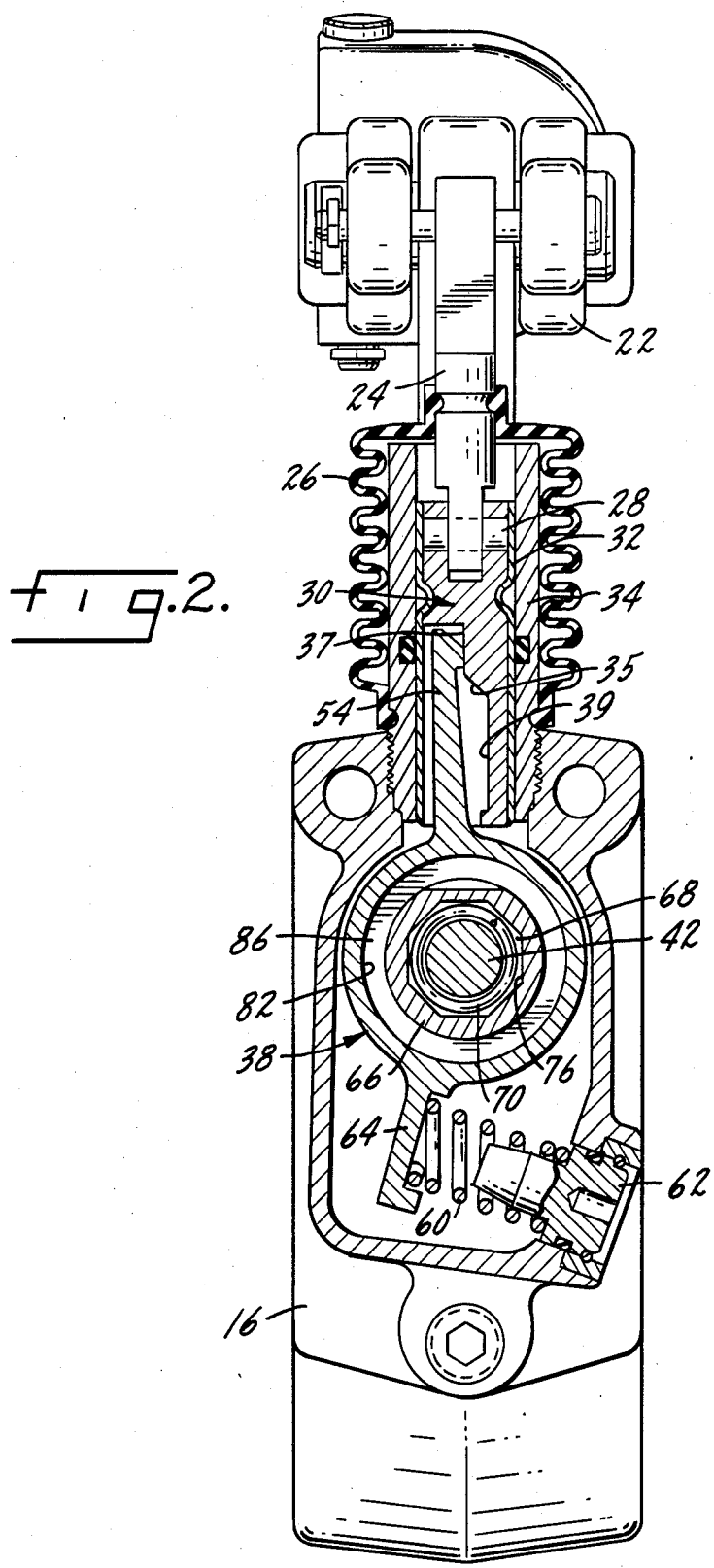
FIG. 2 is a section along plane 2—2 of FIG. 1 through the adjusting mechanism of the slack adjuster.

Referring to FIGS. 1 and 2, a shaft is indicated at 10 and is the brake operating shaft of a conventional over-the-road vehicle brake system. The shaft 10 may be what is known in the trade as an S-cam shaft in reference to the manner in which the shaft brings about operation of the brakes. A drive member or worm gear 12 having a plurality of spaced inwardly directed splines 14 is connected to shaft 10 with gear 12 being rotatably mounted within a body indicated generally at 16. A side cover plate may be mounted to the body and seals may be inserted where required to protect the body interior.

The opposite end of body 16 from worm gear 12 pivotally mounts a yoke 22 which is journaled to the body and which will conventionally be connected to or extend outwardly from the brake operating chamber. Yoke 22 is pivotally connected to a link 24 which forms the connection between the slack adjuster apparatus to be described and the yoke which functions as a lever arm.

Link 24 is at least in part enclosed by a protective boot 26 with the link extending into the boot and being pivotally connected therein by a rivet or the like 28 to a sliding cam 30. Cam 30 is attached to and positioned within a tube 32 which is positioned for sliding movement within a bushing 34 attached to body 16. Straight-line movement of the cam and its associated tube in accordance with movement of link 24 is assured by bushing 34. Cam 30 has a ramp 35 positioned between two parallel, but offset, cam surfaces 37 and 39, with the cam surfaces being positioned for contact by an arm portion 54 of an adjustment member 38.

Adjustment member 38 is positioned within a chamber formed by a housing member 40 which is attached by means of suitable fastening members or the like to body 16. Adjustment member 38 is coaxially positioned about a driving bushing or shaft 42, with the inward end of shaft 42 being in driving relationship with a worm 44 which is effective to drive gear 12. Worm 44 is positioned within a chamber 41 in body 16 and, although not shown, there may be an insert in the chamber to reduce stress concentrations on the body.

Figure 8:
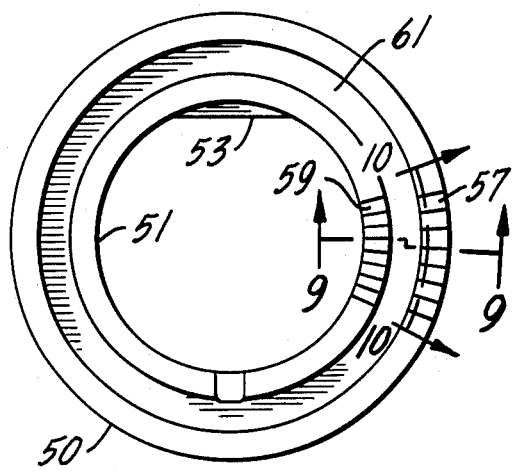
FIG. 8 is a side view of the adjuster clutch.

Adjustment member 38 has a cylindrical face portion 46 which has a plurality of ratchet teeth 48 thereon, which will be described in more detail hereinafter. The teeth on adjustment member 48 are positioned for mating engagement with ratchet teeth on an adjustment clutch 50, illustrated in FIGS. 8, 9 and 10. The adjustment clutch is positioned adjacent the cylindrical portion of the adjustment member and, as illustrated in FIG. 8, has an interior bore 51 with a flattened area 53, which provides a driving connection between the adjustment clutch and a locking bushing 66 described hereinafter. Adjustment clutch 50 has ratchet teeth on each side thereof with the disposition of the teeth on the adjustment clutch and on adjustment member 38 permitting counterclockwise rotation of adjustment member 38 without any consequent rotation of adjustment clutch 50, but will not permit such movement in the clockwise direction without a consequent turning of shaft 42. Positioned adjacent adjustment clutch 50 is a bottom clutch member 52 keyed to body 16 by a projection 52a shown in FIG. 6, there being a similar ratchet arrangement between members 50 and 52 to the effect that adjustment clutch 50 will not rotate in a counterclockwise direction relative to clutch member 52, but is permitted to rotate in a clockwise direction. Thus, the combination of the clutch members and the ratchet connections therebetween, provides a one-way clutch.

Adjustment member 38 has a cam arm 54 which rides against cam surfaces 35, 37 and 39 of cam 30. The normal position, when the brakes are unoperated, is for the nose of arm 54 to be positioned against cam surface 37, as illustrated, and the adjustment member is maintained in that position by a coil spring 60 mounted upon a spring support 62, with the spring bearing against spring arm 64 of adjustment member 38. The spring urges adjustment member 38 in a clockwise direction, but the adjustment member is retained in the position shown by cam 37 when the brakes are unoperated. Spring 60 is normally compressed when the adjustment member is assembled in the slack adjuster and thus will urge clockwise rotation of adjustment member 38, when permitted by the position of cam 30, e.g. when the cam has moved upward a distance to permit the nose of the adjustment member to move inward to cam surface 39 which takes place when ramp 35 has moved upwardly beyond the nose. The adjustment member can only move in this manner, which will cause a slack take-up, when permitted to do so by the cam and when the brakes are not in a fully-applied position.

Coaxially positioned about shaft 42 is a locking bushing 66 which has an internal recess 68 mounting a small coaxially arranged coil spring 70 which urges a bushing 72 outwardly from or away from the locking bushing. Bushing 72, also coaxially arranged about shaft 42, has an exterior multiflatted surface 74 which may, for example, be octagonal in configuration, which mates with a similar octagonal surface 76 on the interior of bushing 66. Thus, the octagonal or mating mechanical surfaces 74 and 76 form a driving connection between locking bushing 66 and bushing 72.

Shaft 42 has a shaped head 78 which may, for example, be hexagonal and mates with a similar hexagonal interior surface 80 on that portion of bushing 72 which is positioned adjacent head 78. Accordingly, the mating hexagonal surfaces described perform a driving connection between bushing 72 and shaft 42 and thus between the shaft and adjustment clutch 50 through locking bushing 66.

Formed between recessed areas of the exterior of bushing 66 and the interior of adjustment member 38 is a chamber indicated at 82 in which are a spacer 84 and a series of wave washers 86 which function to urge the adjustment member and the locking bushing in opposite directions and to maintain firm contact of the described ratchet surfaces of adjustment member 38, adjustment clutch 50 and clutch member 52.

There may be a number of seals, which are not specifically designated herein, but which will be provided at conventional locations to perform the customary sealing functions in devices of this type. Those skilled in the art will readily appreciate the function and location of seals in a slack adjuster of this type.

Shaft 42 may be formed in a plurality of sections to provide what in essence is a universal joint to accomodate slight misalignments between the shaft and worm 44. Specifically, there may be an interior shaft section 90 which forms a universal connection between the worm and the main portion of shaft 42. In each case there is a nose and slot connection, similar to a conventional screwdriver nose and slot configuration, providing a universal joint connection to accomodate misalignment between shaft 42 and worm 44.

Housing cover 40, as indicated above, is attached to body 16 and may be removed and in so doing will remove all of the slack adjustment mechanism described. This permits the slack adjustment portion of the device to be removed as a unitary assembly or cartridge without removing the entire mechanism from the vehicle brake system, providing for substantial ease in maintenance.

Figure 3:
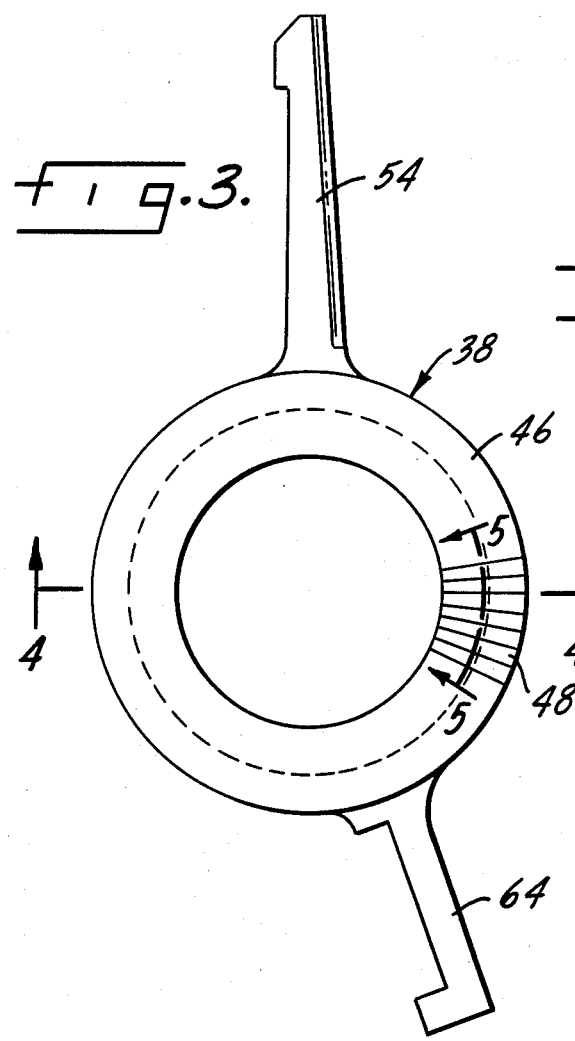
FIG. 3 is a side view of the adjustment member.
Figure 4:
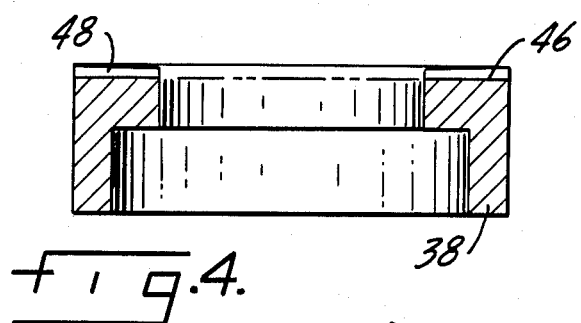
FIG. 4 is a section along plane 4—4 of FIG. 3.
Figure 5:
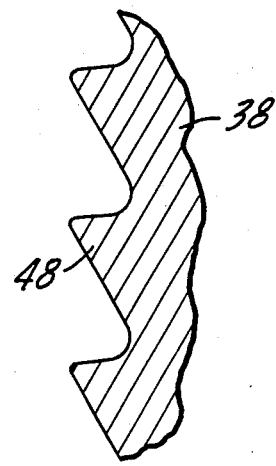
FIG. 5 is a section along plane 5—5 of FIG. 3.
Figure 6:
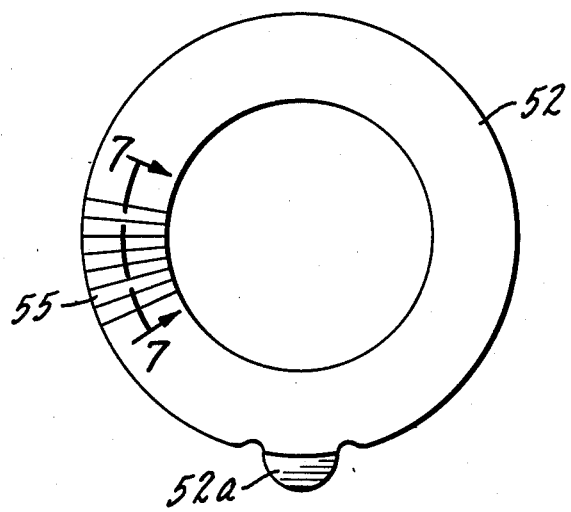
FIG. 6 is a side view of the clutch member.
Figure 7:
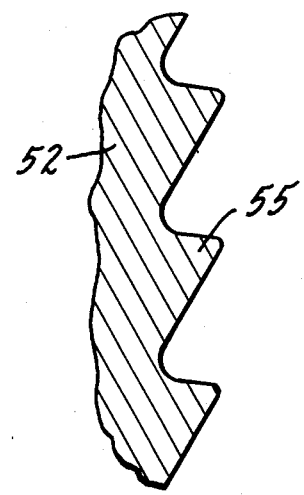
FIG. 7 is a section along plane 7—7 of FIG. 6.
Figure 9:
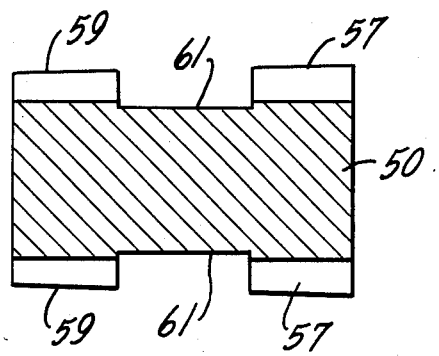
FIG. 9 is a section along plane 9—9 of FIG. 8.
Figure 10:
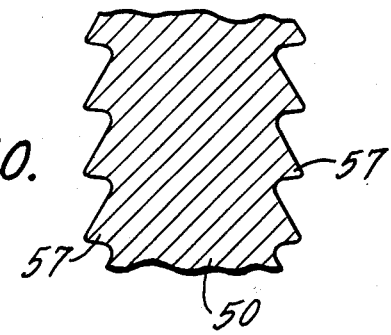
FIG. 10 is a section along plane 10—10 of FIG. 8.

The present application is specifically concerned with the one-way clutch mechanism which includes clutch member 52, adjustment clutch 50 and adjustment member 38 and more specifically, the ratchet teeth construction which provides for cooperative engagement of these members. Adjustment member 38 is illustrated in detail in FIGS. 3, 4 and 5. The adjustment member has a face 46, as described, with a plurality of radially-extending teeth which are shown at twenty times actual size in FIG. 5. The teeth on face 46 will face adjustment clutch 50 which in turn is illustrated in FIGS. 8, 9 and 10. The opposite side of adjustment clutch 50 from that facing adjustment member 38 faces clutch member 52 which is illustrated in FIGS. 6 and 7, with the teeth in FIG. 7 being shown at twenty times actual size. Clutch member 52 has a plurality of radially-extending teeth 55 which are essentially the same as teeth 48 on adjustment member 38. Adjustment member 38 is rotatable in a counterclockwise direction relative to adjustment clutch 50, but is prevented from rotating in a clockwise direction. Adjustment clutch 50 is rotatable in a clockwise direction relative to clutch member 52, but cannot rotate in a counterclockwise direction.

Adjustment clutch 50, illustrated in FIGS. 8, 9 and 10, on each side thereof, has radially spaced bands of ratchet teeth with the teeth in each band being essentially of the same size and spacing as the teeth on either of the adjustment member or clutch member. However, because there are two bands of teeth or a plurality of bands, with the apexes of the teeth in one band being staggered or intermediate the apexes of the teeth in the other band, the combination of teeth provides twice as many increments of adjustment as there would be if the teeth on the clutch elements were identical.

For example, assume that there are 75 teeth circumferentially spaced about face 46 of adjustment member 38 and each band of teeth on adjustment clutch 50 has 75 teeth. Since the teeth in only one band on the adjustment clutch can mate or cooperate with the teeth on the facing element, there are 150 incremental steps of adjustment.

In FIG. 8, the outer band of teeth is indicated at 57 and the inner band of teeth is indicated at 59. As shown in FIG. 9, there is a groove 61 intermediate the two bands of teeth. In effect, there are two separate ratchets on each side of adjustment clutch 50. As shown in FIG. 8, the apex of each tooth in inner band 59 is midway between the adjoining apexes of the teeth in outer band 57. The teeth on the bands on adjustment clutch 50 do not have the same depth as the facing teeth on either adjustment member 38 or clutch member 52. This is not, however, critical, as the teeth normally do not completely mesh with each other. One tooth does not fall totally within the opposite or opposing groove. In practice, normally there is approximately fifty percent of tooth area contact.

Such a staggered tooth arrangement permits very fine increments of adjustment without the necessity to manufacture gear teeth which are quite small and even delicate. Each of the bands of gear teeth and the teeth on the adjustment member and the clutch member need have only half as many teeth as would be required to provide the same number of incremental steps of adjustment.

The method of construction of the clutch elements may vary from orbital forging to the use of powdered metal. In the embodiment of FIGS. 8, 9 and 10, either form of manufacture may be satisfactory. What is important is to have multiple bands of gear teeth, not limited to two, with a gap or space separating the bands of teeth, with the teeth being staggered so that only teeth in one band will mate with the opposing clutch face at a time.

In operation, when the brakes are applied, the brake chamber will have an increase in air pressure permitting the brake chamber to cause movement of its associated brake rod, which may be connected to yoke 22. Body 16, accordingly, will be pivoted in a clockwise direction to transmit corresponding clockwise movement through worm gear 12 to S-cam shaft 10 to apply the brakes. As body 16 moves in a clockwise direction, link 24 will be moved upward, which will cause cam 30 to rise. Such rising movement of cam 30 may or may not prevent counterclockwise rotation of adjustment member 38, depending upon the amount of upward movement of the cam. In a normal brake application there is the force required to fully apply the brakes to provide for complete contact between the brake drums and the associated brake shoes. Normally, there is also a brake application period described as the wrap-up, after full contact between the brake members in which the brake application member, in this case yoke 22, will apply a degree of stress or strain to the various elements comprising the brake application mechanical system. Assuming cam 30 has moved a distance, after complete brake application, such that the nose of arm 54 of adjustment member 38 is still in contact with ramp surface 37, there has been no slack sensed in the system and upon release of the brakes, all of the elements will return to their initial position.

If during a brake application cam 30 has moved a distance whereby arm 54 of adjustment member 38 is beyond ramp 35, and opposite cam surface 39, adjustment member 38 and its arm 54 will move in a clockwise direction into contact with surface 39 if the brakes have not been fully applied. If the brakes have been fully applied, the adjustment member cannot move because clockwise movement is prevented by the rigid mechanical connection between shaft 10, worm gear 12, worm 44 and shaft 42.

The described ratchet connection between adjustment member 38 and shaft 42 only provides for clockwise movement of the adjustment member and consequent movement of shaft 42, worm 44 and gear 12 from the force of spring 60 if the brakes have not been fully applied. Such movement of the cam, without the brakes being fully applied, would indicate that there is slack in the system which needs to be taken up. Slack is taken up on the brake application portion of the operation cycle and not on brake release as is more customary. The movement of gear 12 relative to body 16 by the described adjustment mechanism brings about the take-up of slack.

Figure 11:
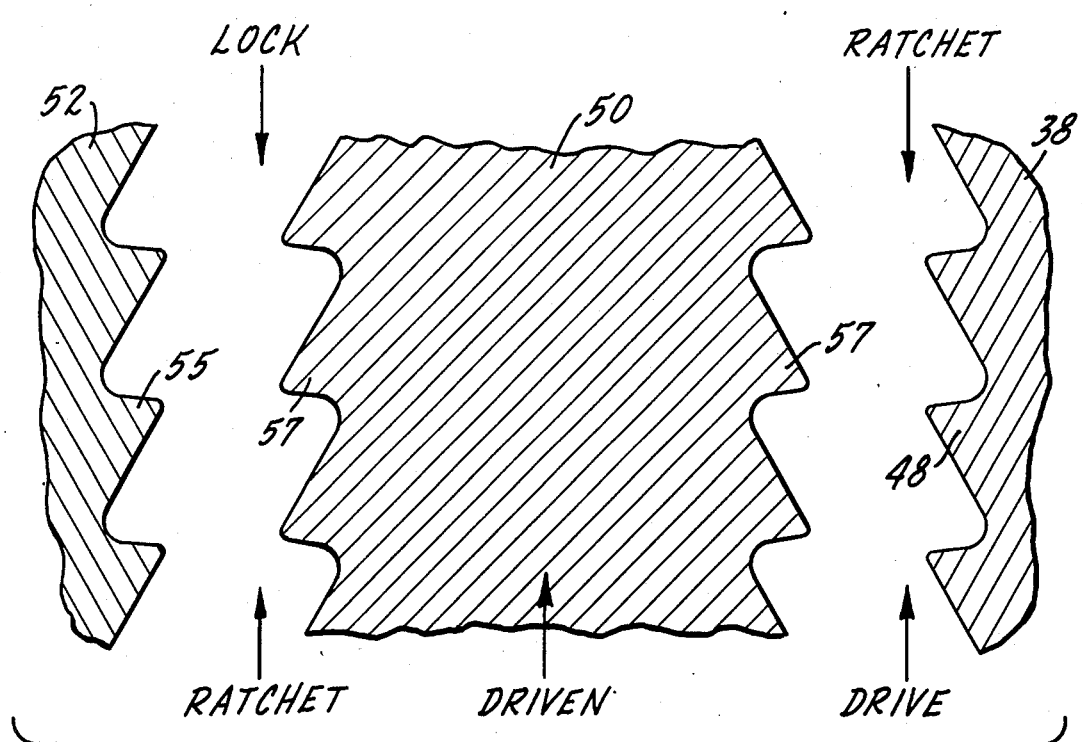
FIG. 11 is an enlarged diagrammatic illustration of the cooperation between the elements in FIGS. 3-10

If slack is taken up during the brake application cycle when conditions permit, as described above, during brake release cam 30 will move downward and adjustment member 38 will rotate in member 38 will rotate in a counterclockwise direction, as dictated by movement of the cam and its ramp 35, and such counterclockwise rotation of adjustment member 38 will compress spring 60. The rotation of adjustment member 38 is permitted by the ratchet connection between the adjustment member and adjustment clutch. Note FIG. 11 which shows the ratchet direction of movement and the drive direction of movement for the cooperating ratchet surfaces of adjustment member 38 and adjustment clutch 50. Note also the ratchet and locking direction for the mating surfaces of clutch member 52 and adjustment clutch 50. The amount of movement by adjustment member 38 in moving into contact with cam surface 39 is the amount of movement permitted by one increment or one tooth of the adjustment clutch. Regardless of the travel of cam 30, adjustment member 38 cannot move more than the distance permitted by ramp 35 and this distance is the same as that permitted by the separation between cam surfaces 37 and 39 on cam 30.

Adjustment member 38 ratchets past adjustment clutch 50 when the adjustment member moves in a counterclockwise direction and drives the adjustment clutch when it moves in a clockwise direction. The adjustment clutch is mechanically connected to shaft 42 which provides the means whereby movement of adjustment member 38 is effective to rotate shaft 42. Clutch member 52 is locked to the body 16. When adjustment clutch 50 is moved in a clockwise direction, it ratchets past clutch member 52. The adjustment clutch 50 cannot move in a counterclockwise direction because of the lock between its ratchet teeth and that of the clutch member.

FIGS. 12 through 18 show a modified form of adjustment clutch member in which the positions of the bands of teeth are reversed from that in the above-described embodiment. The adjustment member is illustrated in FIGS. 12 and 13 and in this case has a face 100 with two separate bands of adjustment teeth indicated at 102 and 104. The inner band of teeth 104 may be formed by means of a separate element or disc indicated at 106 and particularly shown in FIG. 13. The adjustment member may have a plurality of inwardly-directed recesses 108, particularly shown in FIG. 12, which will accomodate outwardly-directed rounded projections 110 on the inner band of adjustment teeth 106, thus permitting the bands of teeth to be formed independently and then assembled together to provide staggered bands of adjustment teeth.

FIGS. 14 and 15 illustrate the adjustment clutch 112 which will have identical teeth 113 on opposite sides thereof, which teeth are not staggered, but are in effect the same as the teeth on either adjustment member 38 or on clutch member 52 in the earlier-described embodiment.

FIGS. 16, 17 and 18 illustrate a clutch member 114 which will have staggered bands of adjustment teeth indicated at 116 and 118. Again, the inner band of adjustment teeth 118 may be formed on a separate element or disc indicated at 120 which can be assembled similar to that described in connection with adjustment member 100 in that there are mating inwardly-directed recesses and outwardly-extending projections, thus enabling the elements to be assembled together into a unitary structure. FIG. 18 shows the disc or inner member 120 and FIG. 17 shows the assembled clutch member with the staggered rows of teeth described.

What is important in the present application is not the overall slack adjuster which has been described in previously-filed applications assigned to the assignee of the present application, but rather the use in such a slack adjuster of a clutch assembly having staggered rows of teeth on one of the clutch elements to provide a higher number of incremental steps of adjustment than would be possible if the same number of teeth were on each of the opposing clutch faces. As described herein, there are two bands of adjustment teeth on one clutch face. The invention should not be limited to this number, as there may be more than two bands. What is important is to provide a plurality of bands whereby there are steps of adjustment which are a multiple of the number of teeth on one of the opposing clutch faces.

Whereas the preferred form of the invention has been shown and described herein, it should be realized that there may be many modifications, substitutions and alterations thereto.

The embodiments of the invention in which an exclusive property or privilege is claimed are defined as follows:

1. In a slack adjuster for vehicle brakes adapted to be mounted between a brake chamber and a brake operating shaft, a body, a drive member movable relative to and positioned by said body on the brake operating shaft, a lever arm pivoted to said body, an adjustable connection between said lever arm and drive member for the sensing and take-up of slack during a brake application, said adjustable connection including a clutch having facing and relatively rotatable clutch surfaces, each of which has opposing cooperating ratchet teeth, the teeth on one of said surfaces being separated into a plurality of radially spaced circumferential bands, the teeth on said opposing surface being radially coextensive with the radially spaced circumferential bands of teeth on said one clutch surface, the teeth in each band being positioned to independently engage teeth on the opposing clutch face to provide increments of slack adjustment equal to the combined number of teeth in said bands.

2. The slack adjuster of claim 1 further characterized in that the number of teeth in one band is equal to the number of teeth on said opposing clutch face.

3. The slack adjuster of claim 1 further characterized in that the teeth on said opposing surface are radially co-extensive with the radially spaced circumferential bands of teeth on said one clutch surface.

4. The slack adjuster of claim 1 further characterized by and including a circumferential gap between adjacent bands of teeth.

5. The slack adjuster of claim 1 further characterized in that the number of teeth in each radially spaced band is equal and equal to the number of teeth on said opposing clutch face.

6. The slack adjuster of claim 1 further characterized in that the teeth on said bands are positioned to independently and alternately engage teeth on said opposing clutch face.

7. The slack adjuster of claim 1 further characterized in that said clutch includes a second pair of facing and relatively rotatable clutch surfaces, each of which has opposing cooperating ratchet teeth with the teeth on one of said surfaces being separated into a plurality of radially spaced circumferential bands, the teeth on each band being positioned to engage teeth on the opposing clutch face.

8. The slack adjuster of claim 7 further characterized in that said clutch includes a clutch member, an adjustment member and an adjuster clutch, with said adjuster clutch being positioned intermediate said clutch member and adjustment member and with said bands of radially spaced teeth being on opposite sides of said adjuster clutch.

9. The slack adjuster of claim 7 further characterized in that said clutch includes a clutch member, an adjustment member and an adjuster clutch, with said adjuster clutch being positioned intermediate said clutch member and adjustment member, said radially spaced circumferential bands of teeth being positioned on the faces of said clutch member and adjustment member which face said adjuster clutch.

10. The slack adjuster of claim 7 further characterized in that said clutch includes a clutch member, an adjustment member and an adjuster clutch, with said adjuster clutch being positioned intermediate said clutch member and adjustment member, said adjustment member being freely rotatable in one direction relative to said adjuster clutch, but being prevented from rotation in the opposite direction by the mating teeth of said adjustment member and adjuster clutch, said adjuster clutch being freely rotatable in one direction relative to said clutch member, but being prevented from rotation in the opposite direction by the mating teeth on said adjuster clutch and clutch member.

11. The slack adjuster of claim 1 further characterized in that said adjustable connection includes a stepped cam movable in response to lever arm travel, and an adjustment member positioned for contact with said cam and movable in accordance with the position of the cam step to sense and take up a limited amount of slack, one of said relatively rotatable clutch surfaces being formed on said adjustment member.

12. The slack adjuster of claim 11 further characterized by and including spring means urging said adjustment member toward said stepped cam.

13. The slack adjuster of claim 12 further characterized in that said clutch is mechanically positioned between said adjustment member and drive member.

* * * * *